July 5, 1960  A. I. BRYNTSE  2,943,755
LIFTING FORK VEHICLES

Filed Sept. 16, 1958  4 Sheets-Sheet 1

ANDERS IVAR BRYNTSE
INVENTOR.

ATTORNEY.

July 5, 1960 A. I. BRYNTSE 2,943,755
LIFTING FORK VEHICLES
Filed Sept. 16, 1958 4 Sheets-Sheet 2
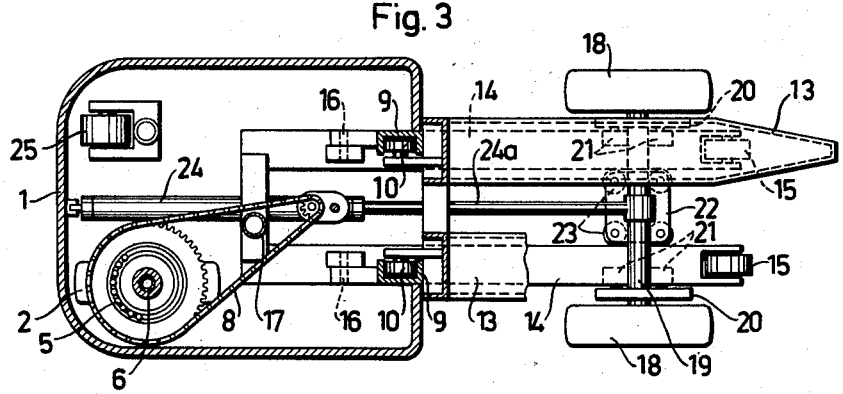
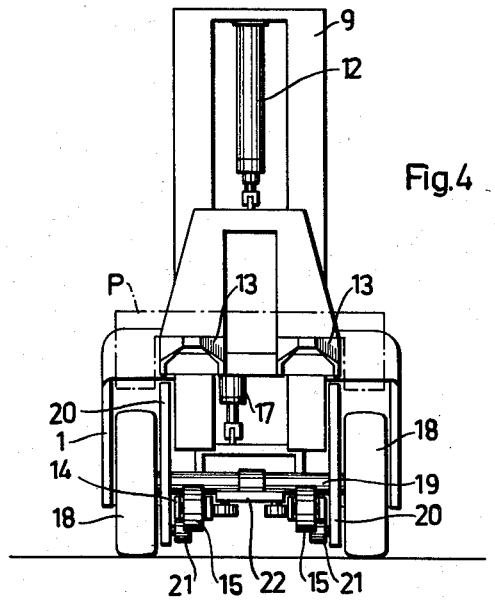
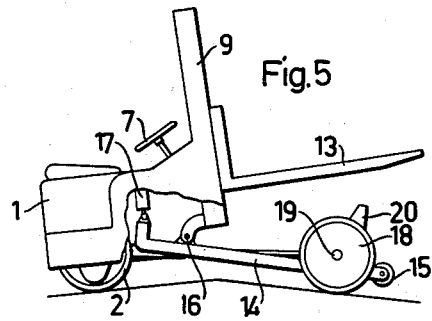
ANDERS IVAR BRYNTSE
INVENTOR.
ATTORNEY.

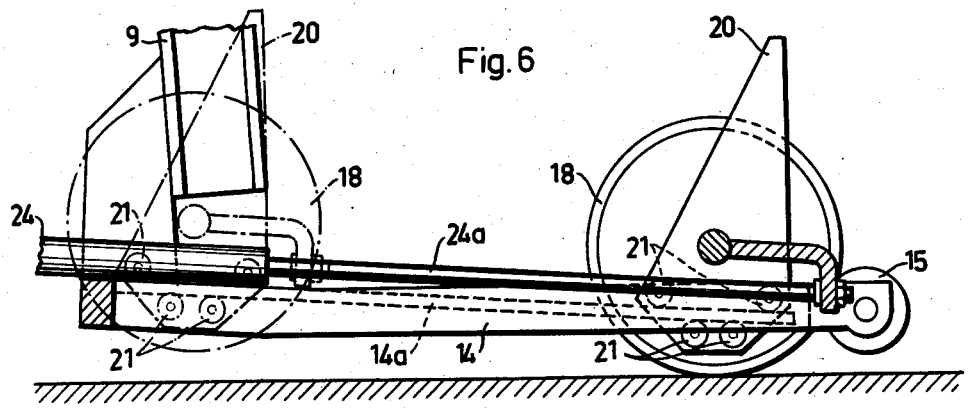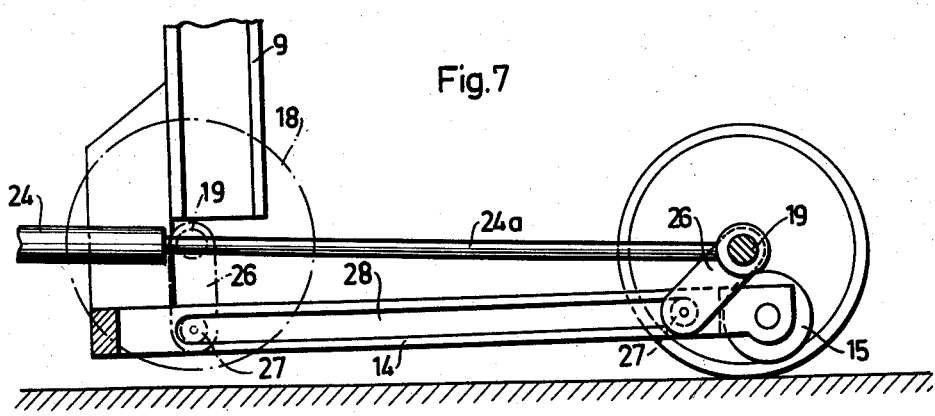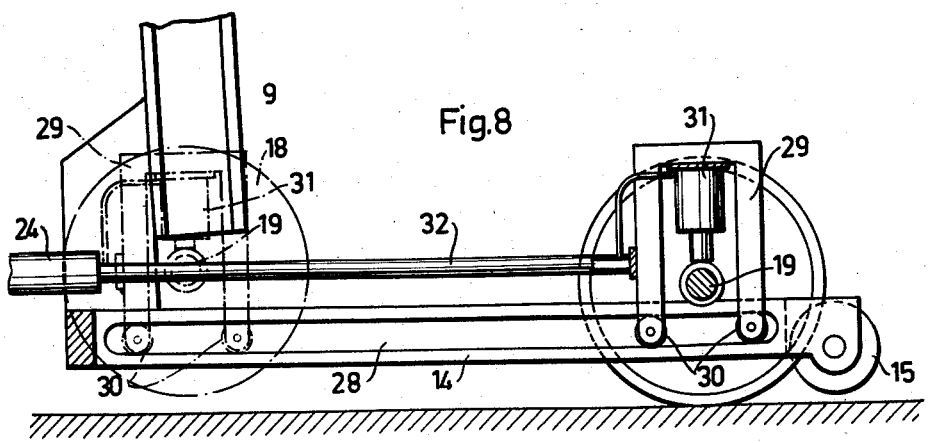

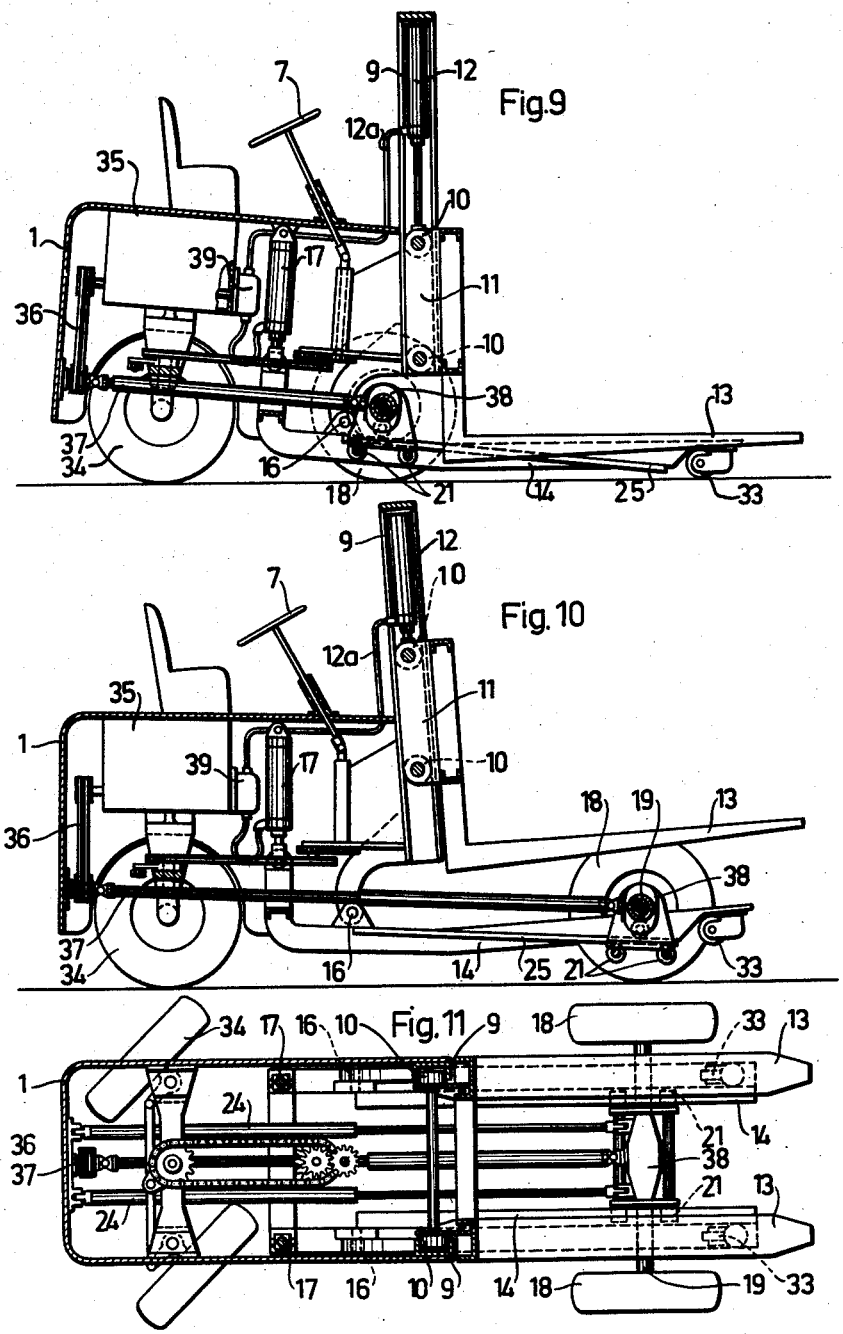

United States Patent Office 2,943,755
Patented July 5, 1960

2,943,755

LIFTING FORK VEHICLES

Anders Ivar Bryntse, Mjolby, Sweden, assignor to Aktiebolaget Bygg-och Transportekonomi, Stockholm, Sweden, a corporation of Sweden Filed Sept. 16, 1958, Ser. No. 761,415

7 Claims. (Cl. 214—672)

In modern handling of goods use is made of rather low pallets in combination with lifting trucks, the lifting means of which such as lifting forks are introduced below the bottom of the pallet whereupon the latter can be lifted and conveyed by means of the truck.

Lifting trucks are designed in various ways, for instance as so called counterweight trucks, as leg-supported trucks, or as a combination of said both types, that is to say a truck having a displaceable lifting frame acting as counterweight truck when the frame is in its forward position to lift the load, and as a leg-supported truck when the frame is in its retracted position. There are two different types of the leg supported lifting trucks, namely a first type which can be referred to as a leg-supported lifting truck of relatively narrow gauge type in which generally U-shaped lifting forks are provided above the wheeled leg supports, and a second type which is of relatively wide-gauge design in which the wheeled leg supports are disposed outside the lifting forks.

However, all these earlier constructions have drawbacks in some respects. Thus, for instance, the counterweight truck is rather heavy and costly and requires very wide passageways at the places where it operates. On the other hand the counterweight truck is easy to operate and can be driven at high speed. The narrow-gauge truck with leg supports does not require so wide passageways but its lateral stability is poor and the driving speed is low. In this respect the broad-gauge leg supported structure is more advantageous but on the other side it requires large space laterally, and it can only handle load of a rather small width. Trucks having a displaceable frame always become relatively heavy and expensive and show the same inconveniences as the counterweight truck when the load is to be tackled.

The main object of the present invention is to provide a lifting truck or lifting device which combines several of the advantages of the known types of trucks while eliminating the inconveniences above referred to. A further object of the invention is to provide a truck in which the supporting legs have large wheels and thin forks, while giving the truck a good lateral stability and enabling the construction of a small and light truck having a high driving speed and a relatively large vertical free space below the truck. A further object of the invention is to provide a truck which is easy to operate and also is cheap to manufacture, only requires relatively narrow passageways and can be used for different kind of loads.

In order to meet all these wishes the invention contemplates a leg-supported truck having relatively small carrying front wheels at the outer or front ends of the supporting legs and preferably low or thin forks. The truck is also provided with at least one set of relatively large wheels adapted to run parallel and longitudinally to the supporting legs. When retracted in their rear position close to the truck proper the latter wheels function as supporting wheels for securing the lateral stability of the truck. In this position the small supporting legs rest upon the floor, ground etc. by means of said relatively small front wheels while the relatively big wheels in their forward position in front of the truck body take up the weight of the load carried by the lifting means or forks of the truck and lift or raise the outer portions of the supporting legs including the relatively small wheels thereof from the floor or ground. Thus, the lifting means or forks under load need not rest on the floor or ground by means of said small wheels during the driving, whereby the floor etc. could be damaged.

It should be noted that in a truck of the narrow gauge type the small wheels must be made of hard material in order to withstand the load. Such small wheels of hard material wear the floor to a high degree and considerable traction force must be available for moving the truck, particularly on uneven floor or ground, and moreover, the small wheels have a tendency of being jammed at sills and in grooves. Such inconveniences are eliminated in the construction according to the invention. In the forward position the relatively large wheels will carry the truck which thus will obtain a considerable lateral stability, so that the truck may be driven at a high speed also when transporting heavy load. At the same time the free vertical space below the truck will be increased.

These and other features and advantages of the invention will be apparent from the following description, reference being had to the accompanying drawings which by way of example but without limitation show certain embodiments of the invention.

In the drawings:

Fig. 3 shows a top view of the same vehicle some details being broken away;

Fig. 4 shows a front view at the same vehicle;

Fig. 5 shows on a smaller scale and in elevation how the same vehicle moves over a sill or a ridge.

Fig. 6 shows diagrammatically in lateral elevation structural details for retraction of the large wheels of the truck to the load carrying position close to the front end of the vehicle while raising the comparatively small wheels from the ground.

Fig. 7 shows, similarly to Fig. 6 an alternative of the structure in Fig. 6.

Fig. 8 shows, also similarly to Figs. 6 and 7, still another alternative to the showings in Figs. 6 and 7.

Figs. 9–11 are similar to Figs. 1–3, but represent a modification of the device according to the invention having displaceable large wheels and smaller castor wheels at the front ends of the supporting legs.

Figure 1:
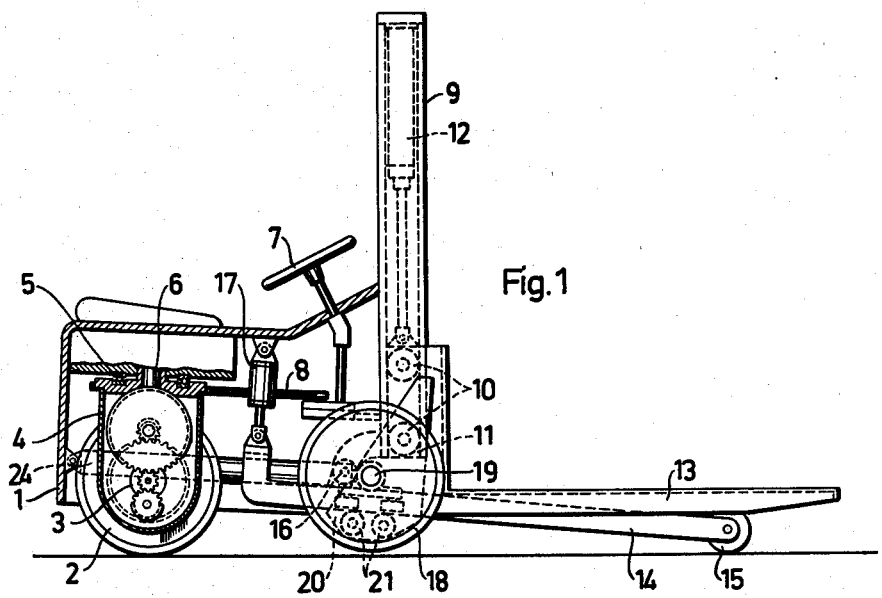
Fig. 1 shows a load lifting vehicle in diagrammatical elevation, in which the supporting leg means rest upon the floor or ground by means of the relatively small front wheels.

The lifting truck according to the embodiment disclosed in Figs. 1 to 5 is provided with a chassis or framing 1 and a driving and guiding wheel 2 which incorporates an electric motor 3 mounted in the hub thereof. The driving and guiding wheel 2 is carried by bracket means 4, which in its turn is supported by a ball bearing 5 and pivotably mounted around a vertical tubular member 6 through which appropriate cables and maneuvering auxiliaries pass to the motor.

The truck also has a steering wheel 7. The steering movement is transmitted to the attachment 4 by means of a chain 8 for instance. However, the steering mechanism can be designed in any other appropriate manner.

At the front part of the chassis or framing there is provided a lifting frame for instance consisting of two vertically disposed U-shaped beams between which a carriage 11 is vertically displaceable, for instance by means of a hydraulic cylinder 12 (Figs. 1 and 2), said carriage being guided by roller members 10 between the U-beams and including lifting forks 13. The latter may be U-shaped in cross section with the channel thereof turned downward. On either side of the truck there is disposed a supporting leg or link member 14 mainly comprising an approximately horizontal rail mounted at its rear end at the truck body and at its front end carrying relatively small wheels 15 of hard material. The supporting legs or rails 14 can either be hinged stationarily to a horizontal shaft at the chassis or framing of the truck, in which case the rails as shown in the position according to Fig. 1 slope or incline slightly downwards in the forward direction, and/or the rails can be hinged to the lifting frame 9 of the truck, for instance at 16 so as to move together with the latter whereby the rails can be lowered in relation to the lifting frame, for instance by means of a hydraulic cylinder 17. In the position shown in Fig. 1 the lifting forks 13 lie immediately above or below the supporting rails 14 in the lowest position of the forks.

Figure 2:
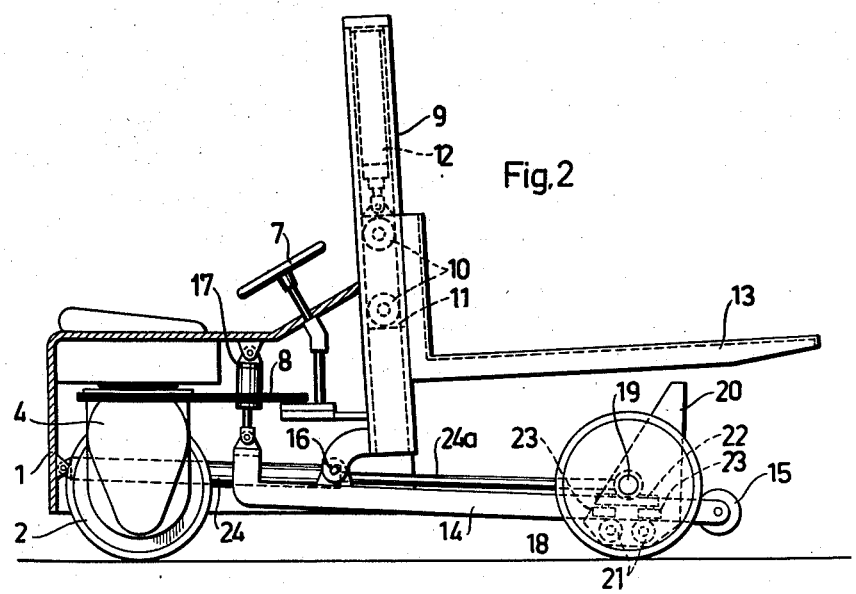
Fig. 2 shows in similar manner the same vehicle with its small wheels unloaded from the ground.

Two relatively large wheels 18, for instance rubber covered ones, are displaceable along the supporting rails 14 from a rear position as shown in Fig. 1 to a forward position as shown in Fig. 2. The wheels 18 are mounted on a common shaft 19 carrying two brackets 20 which are located outside the supporting rails 14. The brackets 20 together with the shaft 19 and the large wheels 18 are adapted to run on the rails 14 by means of the rollers 21, which are in rolling engagement with the lower sides of the rails so as to facilitate the displacement or shifting movement of the wheels 18.

Attached to the shaft 19 of the wheels is also a plate 22 which carries four rollers 23 in rolling engagement with the inner sides of the supporting rails 14 and guiding the displacement or shifting movement of the wheel shaft 19 and the wheels 18.

In the position shown in Fig. 2 the wheel shaft 19 will be pushed forwardly and retracted rearwardly as in Fig. 1 by means of a hydraulic cylinder 24, the piston rod of which is denoted by 24a.

The brackets 20 are so designed that in their rear or inner position as shown in Fig. 1 they prevent the large wheels 10 from being pushed out when the lifting forks 13 are in a too low position. In the outer position of the large wheels 10 of the supporting rails, as shown in Fig. 2, the brackets 20 also prevent a pallet such as P in Fig. 4 resting on the lifting forks 13 from contacting said wheels, due to the fact that the outer ends of the brackets 20 will support and serve as abutments for the lifting forks 13 (Fig. 4).

Fig. 1 shows the truck with the large size supporting wheels 18 in their retracted position in which to some extent they are elevated from the floor or ground in order to render steering of the truck possible. However even in this position the wheels 18 function as supporting wheels for stabilizing the truck laterally in the event that the same has a tendency of tipping or tilting laterally.

When pushed outward into the position indicated in Fig. 2 the large supporting wheels 18 will contact the floor or ground and in this protruded position they will raise the forward portions of the supporting rails and their small wheels 15 from the floor or ground, thus taking over the load pressure of the latter as shown in Fig. 2. As the supporting legs are linked to the lifting frame 9 by means such as 16, the lifting frame will occupy a position slightly tilting rearwardly when the supporting rails are in the position according to Fig. 2.

As shown in the position according to Fig. 2, the centres of the large size wheels 18 are located approximately just below the centre of the load resting on the forks 13 and in this position the wheels 10 impart a considerable stability to the truck even at narrow turn driving since steering is effected by the trailing wheel 2. If desired steering may be facilitated by means of a castor wheel 25, as shown in Fig. 3. In Fig. 3 one of the lifting forks 13 is omitted in order to show the supporting rail and its small wheel 15 more clearly.

Fig. 5 shows how the front and rear parts of the truck according to the invention can occupy an angular or inclined position in relation to one another by forcing the supporting rails 14 forwardly and downwardly by means of the hydraulic cylinder 17 and its linked connection with the rear end of the supporting rail. In this position driving of the truck over load ramp ridges, sills and similar obstacles is highly facilitated. This inclined position is made possible due to the fact that the lifting frame 9 is caused to occupy the inclined position as shown in Fig. 2.

According to Fig. 6 the main supporting rail 14 has a second rail 14a forming a rolling track for the rollers 21 and sloping forwardly and downwardly in relation to the main supporting rail 14. This embodiment is favourable in the case that it is desired to have the supporting rail at as low a position as possible in relation to the floor or ground while still maintaining its cross section as high as possible to give it a high strength.

Fig. 7 shows another embodiment having link means 26 which by means of rollers 27 are adapted to run in a groove 28 in the supporting rail 14. The wheel shaft 19 is mounted at the top end of said link. By means of the piston rod 24a of the hydraulic cylinder 24 the link 26 can be forced forwardly and downwardly on abutting of the lower end of the link at the end of the groove 26 whereby the leading portion of the supporting rail will be lifted so as to raise the relatively small wheel 15 from the floor or ground.

Fig. 8 shows how the wheel shaft 19 can be mounted in a carriage 29 which by means of rollers 30 is adapted to run in grooves 28 in the supporting rails 14. The leading or forward ends of the supporting rails are raised by means of a hydraulic cylinder 31 which on moving the carriage towards the end of the groove is supplied with pressure fluid from the hydraulic cylinder 24. In this case the piston rod 32 of the cylinder 24 is tubular.

The relatively large lifting truck shown in Figs. 9, 10 and 11 has displaceable large size wheels 18 as in the other embodiment but the leading portion of the supporting rails is provided with small castor wheels 33 in lieu of the small wheels 15 according to Fig. 1. The truck according to Figs. 9 to 11 is so designed that even when the large wheels 18 are located in their rear position the truck is carried by said wheels during driving, as shown in Fig. 9.

The castor wheels 33 serve to take up the weight of the load when this load is raised and retracted from a shaft or such like, for instance.

The hydraulic cylinder 17 communicates with the cylinder 12 of the lifting frame 9 and is supplied with compressed fluid therefrom through a pipe 12a. The fluid pressure is proportional to the weight of the load. In this manner, on lifting the load by means of the forks 13 the truck will constitute a combination of a counter-weight truck and a leg supported truck so as to release the castor wheels when the load is taken from the ground. As soon as the large size wheels 18 have been pushed into the position according to Fig. 10—in which the forks 13, in similarity with Fig. 2, are in their raised position—the truck will function as a leg supported truck.

The truck according to Figs. 9–11 is provided with rear or trailing steering wheels 34. From the motor 35 power is transmitted via a chain 36 to a telescopic shaft 37 which is connected with a Cardan joint at 38 by means of which the front wheels 18 are driven. A pressure fluid apparatus 39 is arranged for the different hydraulic functions.

While some particular embodiments of the present invention have been herein illustrated and described, it is not intended that the invention be limited to such dis-

What I claim is:

1. A lifting truck comprising a truck body, at least one lifting fork, substantially horizontal rail-like supporting legs projecting from the forward end of the truck, first wheel means carried at a forward portion of said supporting legs, second wheel means, means for mounting said second wheel means for displacement along said supporting legs, means for displacing said second wheel means along said supporting legs from a rear position adjacent to the forward end of said truck body to a forward position at the forward end of said supporting legs, means for lifting the forward ends of said supporting legs with said first wheel means when said second wheel means is moved into said forward position and for lowering said forward end of said supporting legs and first wheel means to enable said first wheel means to engage the ground when said second wheel means are moved into said rear position, said second wheel means supporting the forward end of the truck during transport of the same and said first wheel means supporting the forward end of the truck during the lifting of the load, said first wheel means being considerably smaller than said second wheel means.

2. A truck as claimed in claim 1, comprising lifting means for lifting said second wheel means for the ground in the rear position of the second wheel means, and for lowering said second wheel means in the forward position thereof, said lifting means being combined with said means for displacing the second wheel means along the supporting legs and comprising a first pressure fluid cylinder with a piston for displacing said wheel means along said legs, a second pressure fluid cylinder with a piston for displacing said second wheel means in a vertical direction with respect to said supporting legs, said first pressure fluid cylinder including a piston and said piston having a hollow shaft forming a connection for transferring pressure fluid from the pressure side of said piston in said first cylinder to the pressure side of the piston in said second cylinder.

3. A truck as claimed in claim 1, comprising lifting means for lifting said second wheel means from the ground in the rear position and for lowering said second wheel means thereof in the front position thereof, said lifting means being combined with said displacing means for displacing said second wheel means along said supporting legs, said lifting means comprising substantially vertical link means, the lower end of said link means being tiltably pivoted in and slidable along horizontal guides on said supporting legs, means connected to the upper end of said link means for displacing said link means along said supporting legs, means for limiting the movement of said link means at the forward position thereof, the path of horizontal displacement of the lower end of said link means being shorter than the path of horizontal displacement of the upper end thereof, said second wheel means being pivoted at the upper end of said link means.

4. A truck as claimed in claim 1, in which said supporting legs are provided with guiding means for the displacement of said second wheel means, said guiding means sloping forwardly and downwardly for raising the forward position of said supporting legs when said second wheel means are in their forward position.

5. A truck as claimed in claim 1, in which said second wheel means are arranged as driving wheels for the truck, wherein traction force from a motor provided on the truck body is transmitted to said second means via a telescoping shaft.

6. A truck as claimed in claim 1 in which said second wheel means is mounted on a carriage, said carriage being displaceable along said supporting legs, said carriage being provided with stop members having an upper stop surface at a higher level than the uppermost surface of said wheel means, said upper surface being disposed under the lifting forks in the forward position of said wheel means for supporting said lifting forks so as to prevent the load from resting upon said second wheel means, and said stop members having also a forwardly directed stop surface adapted to cooperate with the lifting forks when the latter are in their lowermost position, for preventing said second wheel means from being displaced along said supporting legs when the load carried by said lifting forks is lowered to a low level.

7. A truck as claimed in claim 1 in which each of said first wheel means supporting the forward portion of the supporting legs comprises a castor wheel mounted to pivot on a vertical pivot.

References Cited in the file of this patent

UNITED STATES PATENTS

| | | |
|---|---|---|
| 2,366,378 | Barrett | Jan. 2, 1945 |
| 2,623,653 | Framhein | Dec. 30, 1952 |

FOREIGN PATENTS

| | | |
|---|---|---|
| 751,269 | Great Britain | June 27, 1956 |